(12) United States Patent
Carver et al.

(10) Patent No.: US 8,996,408 B1
(45) Date of Patent: Mar. 31, 2015

(54) PROCESSING PURCHASE TRANSACTIONS

(75) Inventors: Lee Carver, New York, NY (US); Bruce Israel, Bethesda, MD (US); Buck W. Clay, IV, Sunnyvale, CA (US); Twum Djin, Mountain View, CA (US); David William Shin, San Francisco, CA (US); Ari Leichtberg, New York, NY (US)

(73) Assignee: Google Inc., Mountain View, CA (US)

( * ) Notice: Subject to any disclaimer, the term of this patent is extended or adjusted under 35 U.S.C. 154(b) by 723 days.

(21) Appl. No.: 12/253,114

(22) Filed: Oct. 16, 2008

Related U.S. Application Data

(60) Provisional application No. 60/980,367, filed on Oct. 16, 2007.

(51) Int. Cl.
*G06Q 30/00* (2012.01)
*G06F 17/30* (2006.01)
*G06Q 30/06* (2012.01)

(52) U.S. Cl.
CPC .................................. *G06Q 30/0633* (2013.01)
USPC ......................................... 705/26.1; 705/27.1

(58) Field of Classification Search
USPC .................................... 705/26–27, 26.1–27.2
See application file for complete search history.

(56) References Cited

U.S. PATENT DOCUMENTS

| | | | |
|---|---|---|---|
| 6,141,653 A | 10/2000 | Conklin et al. | |
| 6,260,024 B1 | 7/2001 | Shkedy | |
| 6,321,234 B1 * | 11/2001 | Debrunner | 1/1 |
| 6,754,636 B1 | 6/2004 | Walker et al. | |
| 7,197,475 B1 * | 3/2007 | Lorenzen et al. | 705/26 |
| 2002/0178074 A1 | 11/2002 | Bloom | |
| 2004/0119757 A1 * | 6/2004 | Corley et al. | 345/837 |
| 2005/0015311 A1 * | 1/2005 | Frantz et al. | 705/26 |
| 2005/0204281 A1 * | 9/2005 | Choate | 715/513 |
| 2006/0085275 A1 * | 4/2006 | Stokes et al. | 705/26 |
| 2007/0055568 A1 * | 3/2007 | Osborne | 705/14 |
| 2007/0162353 A1 * | 7/2007 | Borders et al. | 705/26 |
| 2007/0299732 A1 | 12/2007 | Gluzberg et al. | |
| 2007/0299733 A1 | 12/2007 | Derby et al. | |
| 2008/0015948 A1 * | 1/2008 | Fujimaki | 705/26 |
| 2008/0140569 A1 * | 6/2008 | Handel | 705/44 |
| 2009/0094577 A1 * | 4/2009 | Fachat | 717/106 |
| 2009/0150262 A1 * | 6/2009 | Mizhen | 705/27 |

OTHER PUBLICATIONS

Kurbel, K. (1998). Design and implementation of a database with innovative business-to-business internet applications.The Journal of Computer Information Systems, 38(2), 8-13. Retrieved from http://search.proquest.com/docview/232582484?accountid=14753.*

(Continued)

*Primary Examiner* — Kathleen Palavecino
(74) *Attorney, Agent, or Firm* — Johnson, Marcou & Issacs, LLC

(57) ABSTRACT

A description of one or more items identified by a buyer for purchase is received. Each item is represented as an object in a hierarchical data structure. A processing strategy is executed on the hierarchical data structure to generate purchasing information describing a purchase transaction involving the items. A display preprocessing strategy is executed to create display information describing a display of the generated purchasing information. The display information is transmitted to the buyer for generation of the display using the display information.

28 Claims, 11 Drawing Sheets

(56) References Cited

OTHER PUBLICATIONS

"FirePoppy, Broker Pro.," FirePoppy, Inc., 1 page, [Archived on web.archive.org on Aug. 22, 2003; Retrieved on May 19, 2011] Retrieved from the internet <URL:http://replay.web.archive.org/20030822021619/http://www.firepoppy.com/broker_pro.phtml>.

"Shopatron FAQ," FirePoppy, Inc., 3 pages, [Archived on web.archive.org on Jan. 17, 2004; Retrieved on May 19, 2011] Retrieved from the internet <URL:http://replay.web.archive.org/20040117021450/http://www.firepoppy.com/FAQ.phtml>.

Letter from Ed Stevens, Fire Poppy, Inc. to Jim Hudson, Sullivan Products, dated Sep. 12, 2000, 6 pages.

Screenshots Shopatron (#1-#7), Shopatron, Ltd. 1999, 7 pages, [retrieved from the internet on Aug. 10, 2000] Retrieved from the internet <http://shopatron.ooi.net/shopping_cart.phtml>; <http://shopatron.ooi.net/checkout1.phtml>; <http://shopatron.ooi.netlcheckout3.phtml?multi=>; <http://shopatron.ooi.netlcheckout4.phtml>.

* cited by examiner

PROCESSING PURCHASE TRANSACTIONS

CROSS-REFERENCE TO RELATED APPLICATION

This application claims the benefit of U.S. Provisional Application No. 60/980,367, filed Oct. 16, 2007, which is hereby incorporated herein by reference.

BACKGROUND OF THE INVENTION

1. Field of the Invention

This invention pertains in general to electronic commerce and in particular to processing purchase transactions.

2. Description of the Related Art

Electronic commerce has become commonplace. There are many merchants conveniently offering goods and services via web sites on the Internet, and there are an even greater number of buyers who purchase the goods and services. In many cases, the electronic commerce transactions involve physical goods. For example, many buyers purchase items such as books, compact disks (CDs) and DVDs. Buyers can also purchase electronic content such as downloadable text and/or music and access to web sites that provide news or entertainment stories.

Some electronic commerce sites on the Internet allow buyers to use third party electronic commerce payment systems to process purchase transactions. Third party payment systems allow buyers to purchase goods or services from multiple merchants. A benefit of a third party payment system is that a buyer does not have establish an account and/or provide payment information (e.g., credit card number) to each merchant that the buyer patronizes. Instead, the buyer can purchase goods and services from multiple merchants while only providing payment information to the third party payment system.

The problem with current third party systems is that since they communicate with multiple merchants, it is difficult for third party payment systems to handle all types of purchase transactions. For example, if a buyer wants to apply a coupon to a purchase transaction, a third party payment system may not be capable of incorporating the coupon into the purchase transaction. Additionally, Internet purchases are made by buyers all over the world, but third party payment systems are restricted for use in specific countries because they can only handle tax laws of select countries. Thus, there is a need for a flexible way to process purchase transactions.

BRIEF SUMMARY OF THE INVENTION

The above and other needs are met by a method, a computer program product, a computer-implemented system, and a memory. Embodiments of the method process one or more items identified by a buyer for purchase from a merchant and comprise receiving a description of the one or more items identified by the buyer for purchase. Each item is represented as an object in a hierarchical data structure. A processing strategy is executed on the hierarchical data structure to generate purchasing information describing a purchase transaction involving the items. A display preprocessing strategy is executed to create display information describing a display of the generated purchasing information. The display information is transmitted to the buyer for generation of the display using the display information.

Embodiments of the computer program product also comprise a communication module configured to receive a description of the one or more items identified by the buyer for purchase. A hierarchy generation module is configured to represent each item as an object in a hierarchical data structure. A processing module is configured to execute a processing strategy on the hierarchical data structure to generate purchasing information describing a purchase transaction involving the items. A display module is configured to execute a display preprocessing strategy to create display information describing a display of the generated purchasing information and transmit the display information to the buyer for generation of the display using the display information.

Embodiments of the computer-implemented system also comprise a communication module configured to receive a description of the one or more items identified by the buyer for purchase. A hierarchy generation module is configured to represent each item as an object in a hierarchical data structure. A processing module is configured to execute a processing strategy on the hierarchical data structure to generate purchasing information describing a purchase transaction involving the items. A display module is configured to execute a display preprocessing strategy to create display information describing a display of the generated purchasing information and transmit the display information to the buyer for generation of the display using the display information.

Embodiments of the memory store data for access by a computer program being executed on a computer and comprise a data structure stored in the memory. The data structure describes a hierarchy storing data supporting an electronic purchase transaction and comprises a shopping cart object at a root of the hierarchy and representing an electronic shopping cart holding one or more items involved in the purchase transaction, one or more item objects beneath the shopping cart object in the hierarchy, an item object representing an item identified by a buyer for purchase from a merchant and involved in the purchase transaction, and one or more purchase information objects beneath the shopping cart object in the hierarchy, a purchase information object representing purchase information for the purchase transaction involving the item, merchant, and buyer. At least one object includes one or more tags for processing the object during the process transaction.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

I. Overview

Figure 1:
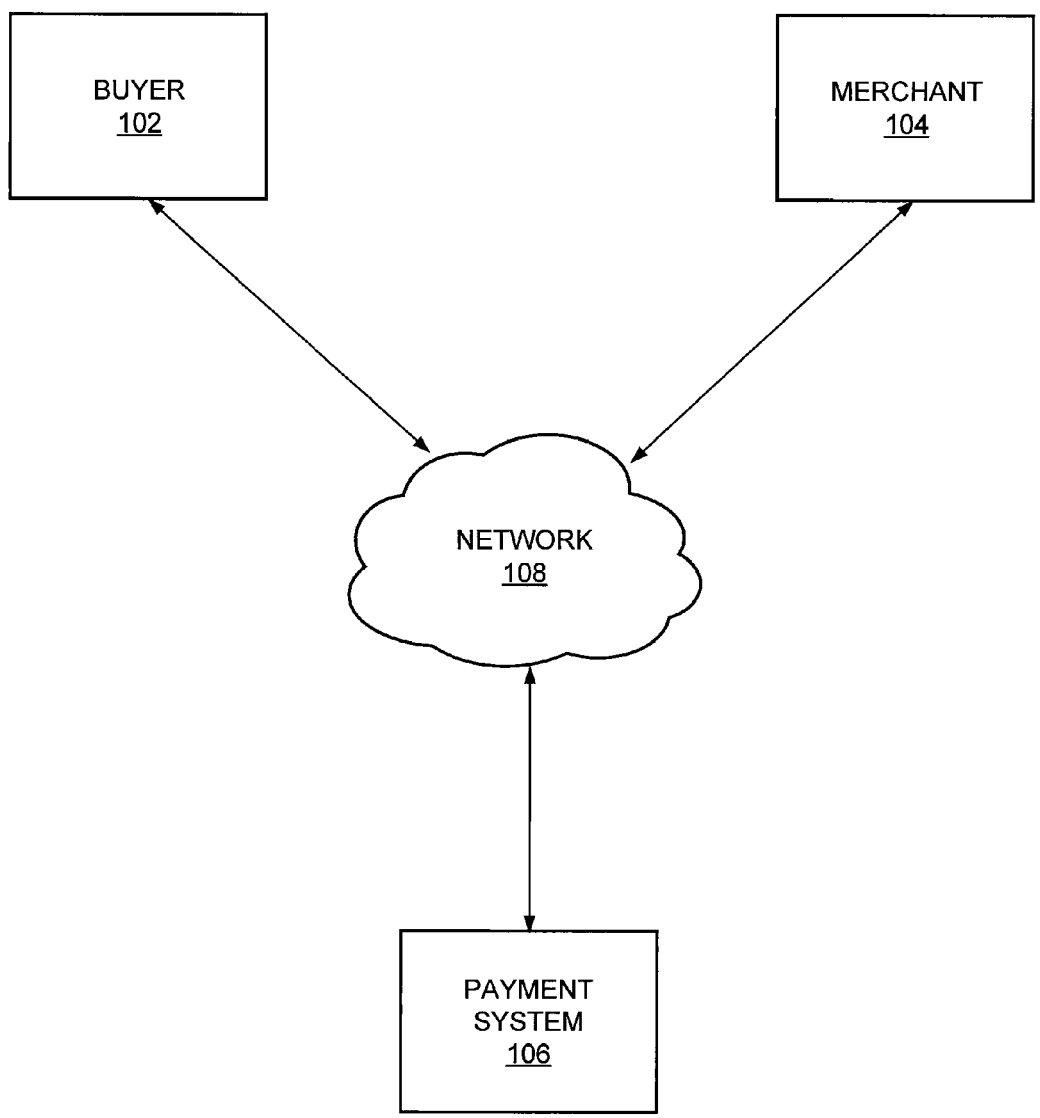
FIG. 1 is a high-level block diagram of an electronic commerce environment according to one embodiment.

FIG. 1 is a high-level block diagram of an electronic commerce environment according to one embodiment. FIG. 1 illustrates a buyer 102, a merchant 104, and a payment system 106 connected by a network 108.

The buyer 102 in this embodiment represents an entity that obtains items via the network 108 through purchases or other types of transactions. The buyer 102 is sometimes referred to as the "customer" and the transaction is sometimes referred to as a "sale" or "purchase." As used herein, these terms also refer to other types of transactions, regardless of whether the buyer is technically a "customer" or the transaction is technically a "sale."

In one embodiment, the buyer 102 communicates with the merchant 104, via the network 108, to view web pages that display items offered for sale by the merchant 104. In one embodiment, the buyer 102 can use the payment system 106 to purchase one or more items from the merchant 104. To complete the purchase transaction the buyer 102 provides the payment system 106 with specific information, such as shipping information (e.g., shipping address, shipping method) and payment information (e.g., credit card number).

In one embodiment, the buyer 102 includes a computer system that is utilized by a user to communicate with other computers on the network 108. The computer system, for example, can be a personal computer executing a web browser such as MICROSOFT INTERNET EXPLORER that allows the user to retrieve and display content from web servers and other computer systems on the network 108. In other embodiments, the buyer 102 includes a network-capable device other than a computer system, such as a personal digital assistant (PDA), a cellular telephone, a pager, a television "set-top box" etc. Although FIG. 1 illustrates only a single buyer 102, embodiments can have multiple buyers 102 coupled to the network 108. The single buyer 102 is illustrated in order to simplify and clarify the present description. As used herein, the reference number 102 refers to both a single buyer and/or a set of buyers, depending upon the context.

Similarly, the merchant 104 represents an entity that sells items on the network 108 or makes items available through other types of transactions. The merchant 104 offering an item to the buyer 102 is sometimes referred to as the "seller" and the transaction is sometimes referred to as a "sale" or "purchase." As used herein, these terms also refer to other types of transactions, regardless of whether the merchant 104 is technically a "seller" or the transaction is technically a "sale."

In one embodiment, the merchant 104 includes a computer system acting as a web server that is utilized to offer the items to potential buyers 102. The items offered by the merchant 104 can include tangible items such as books, CDs, DVDs, digital cameras and other types of tangible goods, etc. The items offered by the merchant 104 can also include intangible items such as services and electronic content such as web pages, downloadable files, streaming media, etc.

In one embodiment, if a buyer 102 selects to purchase an item from the merchant 104, the merchant 104 places the item in an electronic shopping cart and allows the buyer 102 to continue to search for items to purchase. If the buyer 102 selects to complete the purchase of the items in the electronic shopping cart, the merchant 104 provides the buyer 102 with one or more purchase options. In one embodiment, a purchase option is for the buyer 102 to provide payment information directly to the merchant 104. In another embodiment, a purchase option is for the buyer 102 to use the payment system 106 to purchase the items in the electronic shopping cart. If the buyer 102 selects to use the payment system 106 to purchase the items, the merchant 104 directs the buyer to a payment system web site and transmits to the payment system 106 a list of the items in the electronic shopping cart. In one embodiment, the list is a description of the items in the electronic shopping cart. The list includes detailed information about each item on the list, such as the purchase price and a brief description of the item.

Although FIG. 1 illustrates only a single merchant 104, embodiments can have multiple merchants 104 coupled to the network 108. The single merchant 104 is illustrated in order to simplify and clarify the present description. As used herein, the reference number 104 refers to both a single merchant and/or a set of merchants, depending upon the context.

The payment system 106 represents an entity that serves as an intermediary for the transaction between the buyer 102 and the merchant 104. In one embodiment, the payment system 106 functions as a centralized place that the buyers 102 can use to pay for items offered for sale by different merchants 104. Thus, the buyers 102 can patronize multiple merchants 104 and provide payment information to only the payment system 106.

In one embodiment, the payment system 106 receives from the merchant 104 a list of items that the buyer 102 wishes to purchase from the merchant 104. The payment system 106 converts the list of items into a hierarchical data structure, with each item represented as an object in the hierarchy. Each object in the hierarchy is comprised of information used to enable the purchase transaction.

The payment system 106 selects and executes a processing strategy on the hierarchy, which results in the generation of purchase information necessary for the purchase transaction, such as information describing the taxes applicable to the items. The purchase information is represented in the hierarchy by one or more objects. The payment system 106 additionally selects and executes a display preprocessing strategy based on information included in the hierarchy to create display information describing a webpage, which is presented to the buyer 102. The web page shows purchase transaction information, such as the items being purchased by the buyer 102, the cost of each item, taxes, and the total cost for the purchase transaction. The web page is referred to as a "buy page" herein.

In one embodiment, if the buyer 102 makes selections on the buy page, the payment system 106 updates the hierarchy and a new buy page is presented to the buyer 102 that reflects the selections made by the buyer 102. For example, if the buyer 102 selects expedited shipping for items on the buy page, the payment system 106 updates the hierarchy to reflect the selection of expedited shipping. As a result, a new buy page is presented to the buyer 102 that shows the selection of expedited shipping, the cost of expedited shipping, and an updated total cost for the purchase transaction. In one embodiment, when the buyer 102 selects to complete the purchase transaction, the payment system 106 charges the buyer's method of payment, provides the buyer 102 with a receipt, credits the merchant 104 for the purchase, and sends a message to the merchant 104 to notify the merchant 104 of the completion of the purchase transaction. In one embodiment, the message additionally includes any necessary information that will allow the items to be delivered to the buyer 102 (e.g., shipping address and the shipping method for the items).

Although FIG. 1 illustrates only a single payment system 106, embodiments can have multiple payment systems 106 coupled to the network 108. In one embodiment, the payment system 106 is said to be "remote" from the buyer 102 and/or merchant 104. "Remote" in this context means that the payment system 106 is logically separate from the buyer 102 and/or merchant 104, and does not necessarily refer to a physical distance between the entities.

II. System Architecture

Figure 2:
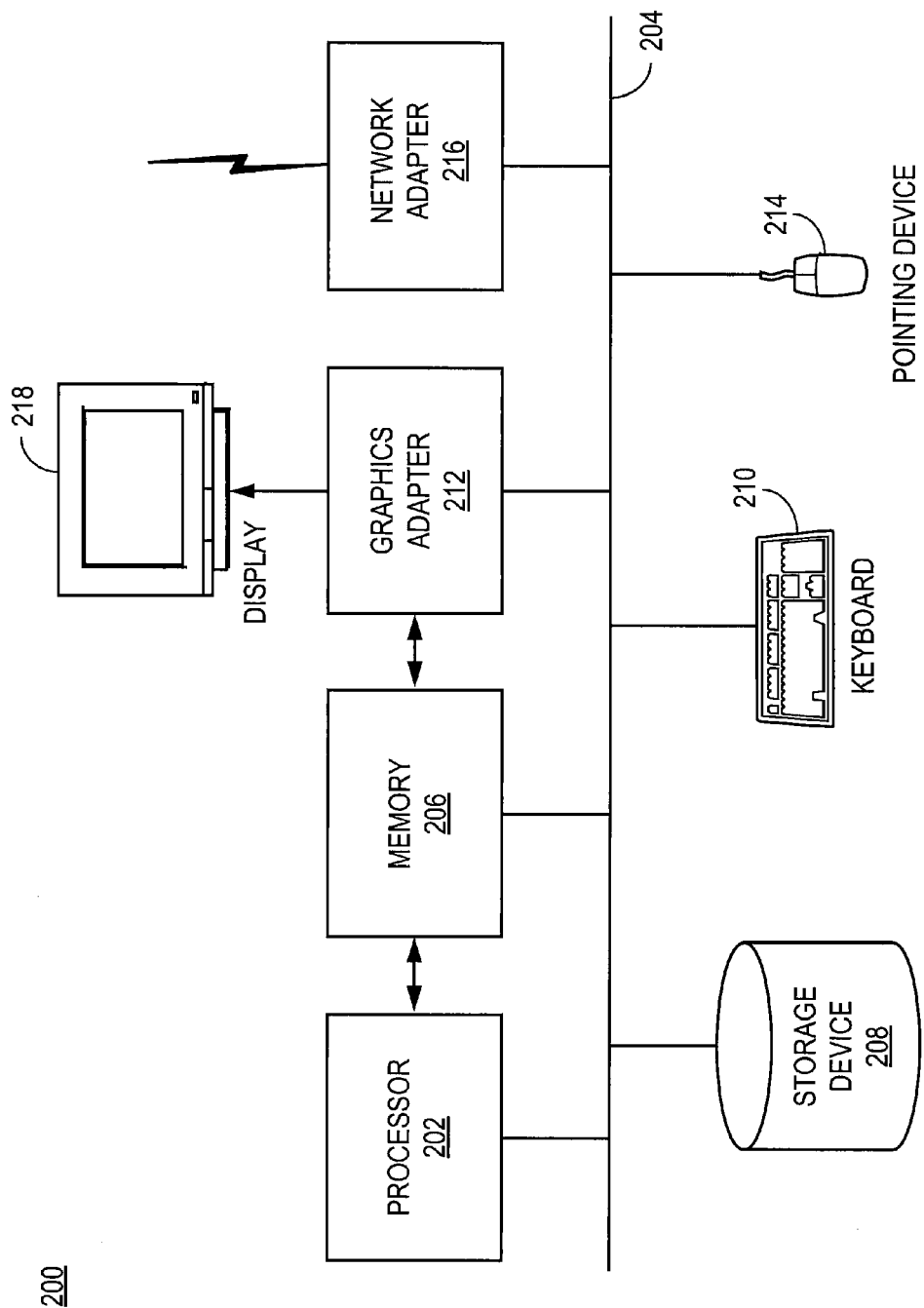
FIG. 2 is a high-level block diagram illustrating a functional view of a typical computer system for use as one of the entities illustrated in the environment of FIG. 1 according to an embodiment.

FIG. 2 is a high-level block diagram illustrating a functional view of a typical computer system 200 for use as one of the entities illustrated in the environment 100 of FIG. 1 according to an embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108. It should be understood that not all components (e.g., display 218, keyboard 210) of the computer 200 are needed for the functionality of some of the entities in FIG. 1.

As is known in the art, the computer 200 is adapted to execute computer program modules. The term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the buyer 102, the merchant 104, and the payment system 106 vary depending upon the embodiment and the processing power utilized by each of the entities. For example, the buyer 102 typically requires less processing power than the merchant 104 and payment system 106. Thus, the buyer computer can be a standard personal computer system. The merchant and payment system computer, in contrast, may comprise more powerful computers and/or multiple computers working together to provide the functionality described herein.

Figure 3:
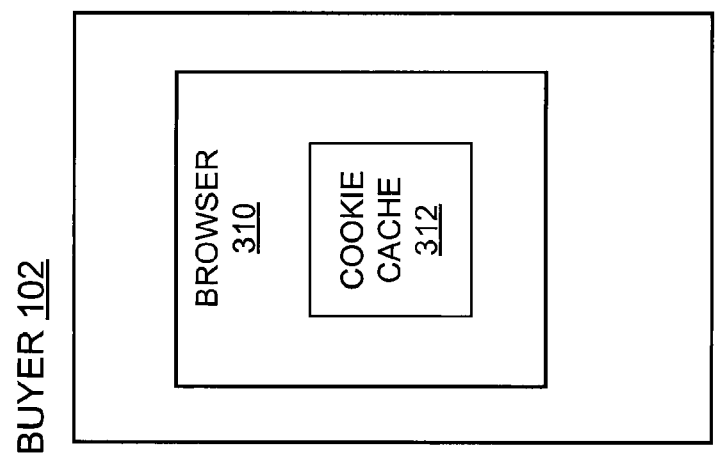
FIG. 3 is a high-level block diagram illustrating modules within a buyer according to one embodiment.

FIG. 3 is a high-level block diagram illustrating modules within a buyer 102 according to one embodiment. Those of skill in the art will recognize that other embodiments can have different and/or other modules than the ones described here, and that the functionalities can be distributed among the modules in a different manner.

As shown in FIG. 3, the buyer 102 includes a browser module 310 that allows the buyer 102 to view web pages provided by the merchant 104, payment system 106, and/or other entities on the network 108. In one embodiment, the browser module 310 is a conventional web browser, such as MICROSOFT INTERNET EXPLORER or MOZILLA FIREFOX. In one embodiment, the browser module 310 supports technologies including JAVASCRIPT and AJAX (Asynchronous JAVASCRIPT and XML). AJAX is a group of inter-related web development techniques used for creating interactive web applications. In one embodiment, the browser module 310 receives a data-package from the payment system 106 that includes information on a purchase transaction such as the characteristics and options of the purchase transaction. In one embodiment, the data-package received from the payment system 106 is a serializable hash map. The browser module 310 converts the data-package into a buy page that displays to the buyer 102 the purchase transaction information included in the data-package.

In one embodiment, the browser module 310 maintains a cookie cache 312 that stores cookies associated with web sites on the network 108. The merchant 104 and payment system 106 can communicate with the browser module 310 and instruct it to create a cookie in the cookie cache 312 holding certain information. The browser module 310 provides the cookie to the merchant 104 and/or payment system 106 when the browser connects to the site that created it.

Figure 4:
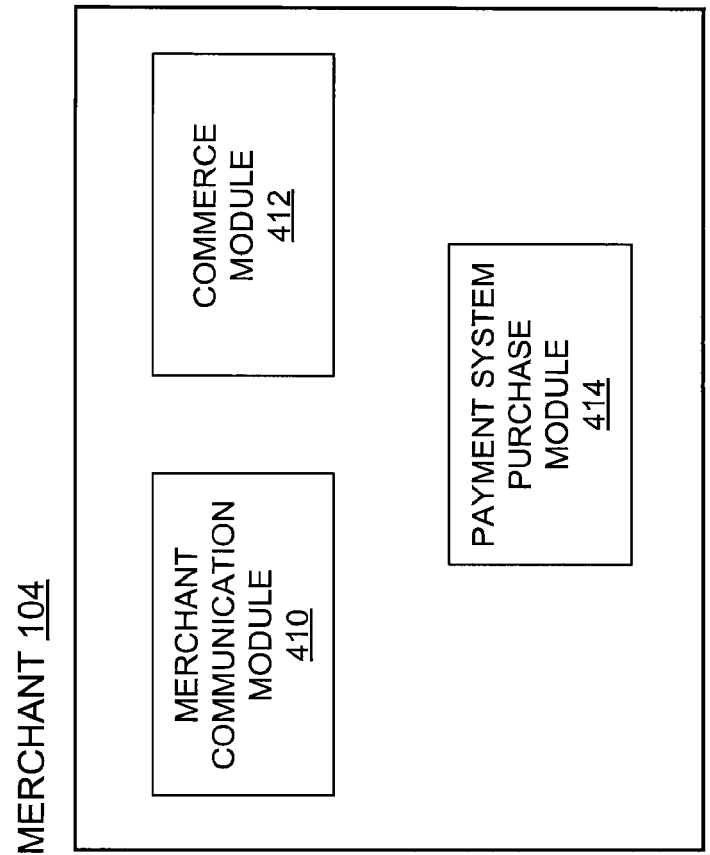
FIG. 4 is a high-level block diagram illustrating modules within a merchant according to one embodiment.

FIG. 4 is a high-level block diagram illustrating modules within a merchant 104 according to one embodiment. Those of skill in the art will recognize that other embodiments can have different and/or other modules than the ones described here, and that the functionalities can be distributed among the modules in a different manner.

A merchant communication module 410 handles all communication with the buyer 102 and the payment system 106 via the network 108. In one embodiment, the merchant communications module 410 includes a web server that provides web pages to the buyer 102 and receives user input sent over the network 108 by the buyer's browser module 310. The merchant communications module 410 thus allows a buyer 102 to navigate the merchant's web site.

In one embodiment, merchant-payment system communications are conducted using the web services description language (WSDL). In one embodiment, the merchant communications module 410 uses WSDL to describe the services it provides and ascertain the services provided by the payment system 106. The merchant communications module 410 uses XML-based remote procedure calls (RPCs) to provide information to the payment system 106 and receive information in return. In other embodiments, the merchant communications module 410 communicates with the payment system 106 using other techniques and/or protocols, such as via email messages, HTML web pages intended for review by human buyers 102, proprietary communications protocols, etc.

A commerce module 412 operates in tandem with the merchant communications module 410 and allows the buyer 102 to engage in electronic commerce transactions with the merchant 104. In general, the commerce module 412 allows the merchant 104 to create and manage a catalog of items available for sale. The buyer 102 can browse the catalog and indicate items that the buyer 102 desires to purchase. In one embodiment, the commerce module 412 utilizes a shopping cart metaphor where items selected by the buyer 102 are placed in an electronic shopping cart. The buyer 102 can select to complete the purchase of the items in the electronic shopping cart, which is sometimes referred to as "checkout." The commerce module 412 provides the buyer 102 with one or more payment options at the time the buyer selects to complete the purchase of the items in the electronic shopping cart. A first payment option is for the buyer 102 to provide payment information directly to the merchant 104. A second payment option is for the buyer 102 to use the payment system 106 to complete the purchase transaction.

A payment system purchase module 414 interacts with the merchant communications module 410 to complete a purchase transaction. The payment system purchase module 414 is activated if a buyer 102 selects to use the payment system 106 to purchase items in an electronic shopping cart. In one embodiment, the payment system purchase module 414 generates a list that describes each item in the electronic shopping cart. For example, the information included for each item in the list includes the price of the item, the quantity being purchased, and a short description of the item. Additionally, the list of items may include shipping rules describing shipping options and/or rates for the items, taxation rules applicable to the items, a merchant ID that uniquely identifies the merchant 104, and/or a transaction ID that uniquely identifies the specific purchase transaction. In one embodiment, the payment system purchase module 414 digitally signs the list of items to prevent third parties from making modifications to it. In one embodiment, the list of items is encoded in the Extensible Markup Language (XML) or JavaScript Object Notation (JSON), although other techniques can also be used.

In one embodiment, the payment system purchase module 414 utilizes the merchant communications module 410 to send the list of items to the payment system 106. In another embodiment, the payment system purchase module 414 uses the merchant communications module 410 to provide the list of items to the buyer 102 and directs the buyer's browser module 310 to send the list of items to the payment system 106. The payment system purchase module 414 can perform this latter task by, for example, by using a HTTP GET method that codes the list of items into a uniform resource locator (URL) that references the payment system 106, and redirecting the buyer's browser 310 to the coded URL. In another example, the payment system purchase module 416 can use a HTTP POST method that codes the list of items into the body of a request made from the buyer's browser 110 to the payment system 106.

In one embodiment, after the payment system 106 completes the purchase transaction with the buyer 102, the payment system purchase module 414 receives through the merchant communications module 410 a message from the payment system 106 that indicates that the purchase transaction has been completed. In one embodiment, the message includes a transaction ID that identifies the purchase transaction, a list indicating the items purchased by the buyer 102, and shipping information for the items. In one embodiment, the shipping information is comprised of the shipping address for the items, the method of shipping (e.g., standard shipping, expedited shipping), and any additional information that specifies how the items should be shipped.

Figure 5:
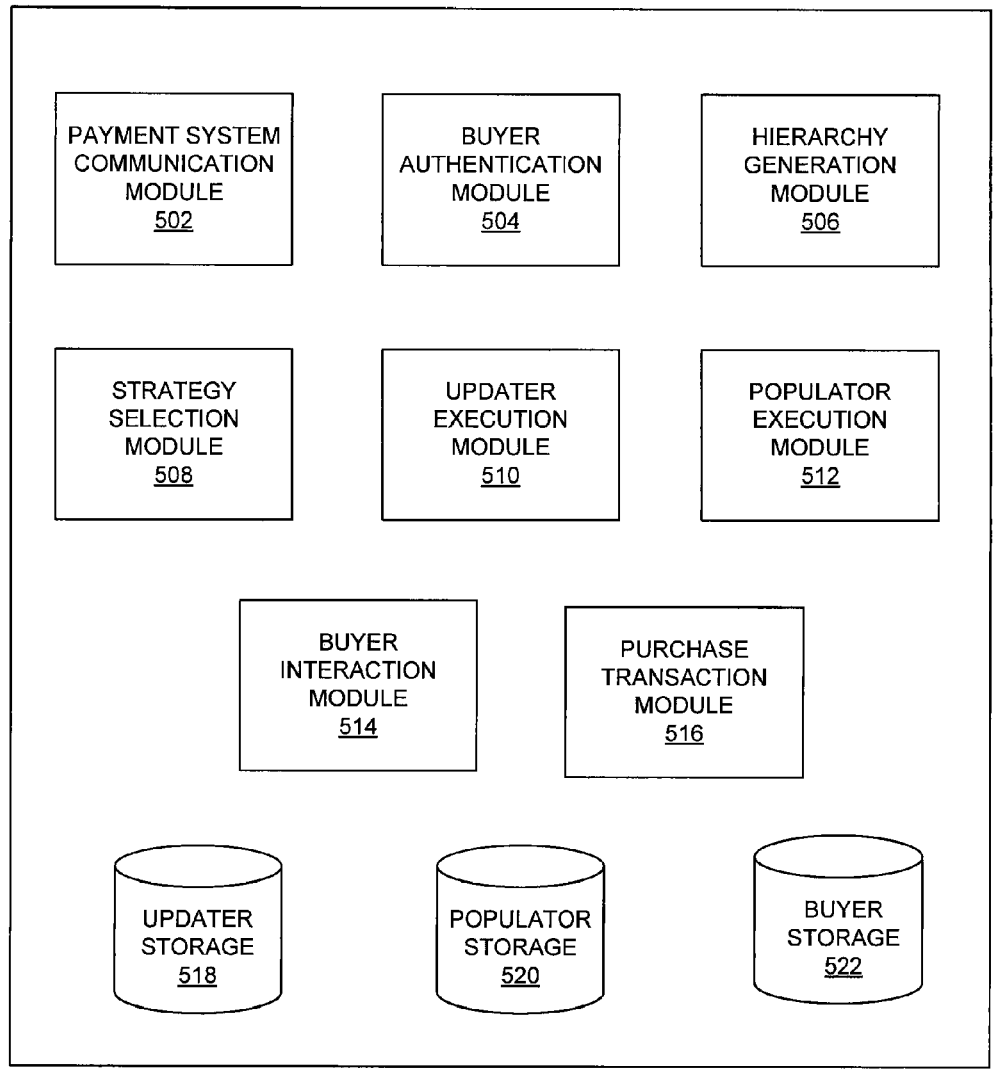
FIG. 5 is a high-level block diagram illustrating modules within a payment system according to one embodiment.

FIG. 5 is a high-level block diagram illustrating modules within the payment system 106 according to one embodiment. Those of skill in the art will recognize that other embodiments can have different and/or other modules than the ones described here, and that the functionalities can be distributed among the modules in a different manner.

The payment system 106 includes a payment system communication module 502 that handles all communication with buyers 102 and merchants 104 via the network 108. In one embodiment, the payment system communication module 502 receives from merchants 104 lists of items that buyers 102 wish to purchase using the payment system 106. In one embodiment, when the payment system communication module 502 receives a list of items from a merchant 104, the payment system communication module 502 ensures that the list of items includes information required by the payment system 106 to process the purchase transaction. In one embodiment, if the list of items does not include the required information, the payment system communication module 502 notifies the merchant 104 that the list of items was not accepted by the payment system 106. Alternatively, if the list of items includes the required information, the payment system communication module 502 notifies the merchant 104 that the list of items was accepted by the payment system 106.

A buyer authentication module 504 authenticates buyers 102 seeking to use the payment system 106 for the purchase of items from a merchant 104. In general, when the payment system communication module 502 receives a list of items that a buyer 102 wishes to purchase and the buyer 102 is directed to communicate with the payment system 106, the buyer authentication module 504 determines whether the buyer 102 has recently provided the payment system 106 with authentication information, such a login ID and password.

If the buyer 102 has not recently provided the payment system 106 with authentication information, the buyer authentication module 504 allows the buyer 102 to login to an existing account, create a new account with the payment system 106, or access the payment system 106 as a guest. In one embodiment, to login to an existing account the buyer 102 enters a login ID and password. The buyer is logged into the payment system 106, if the buyer authentication module 504 determines that the buyer 102 provided the proper login ID and password.

If the buyer 102 selects to create a new account the buyer authentication module 504 presents the buyer 102 with one or more web pages that allow the buyer 102 to create an account by selecting an ID, password and/or other identifying information. In one embodiment, to create the account the buyer 102 also supplies the buyer authentication module 504 with payment information (e.g., credit card number) and other miscellaneous information (e.g., mailing/shipping addresses). Once the required information is received by the buyer authentication module 504, the information is stored by the buyer authentication module 504 in a buyer storage 522. In one embodiment, the buyer storage 522 maintains information on each buyer 102 having an account with the payment system 106. If the buyer 102 selects to access the payment system 106 as a guest, the buyer 102 does not have to provide the payment system 106 with any authentication information.

A hierarchy generation module 506 generates a hierarchical data structure describing a list of items in a merchant shopping cart. In one embodiment, when the payment system communication module 502 receives a list of items from a merchant 104 that includes required information, the hierarchy generation module 506 creates a hierarchy of objects based on the information included in the list of items. In one embodiment, the hierarchy generation module 506 creates the hierarchy by initially creating an object to represent the electronic shopping cart. After creating the electronic shopping cart object, the hierarchy generation module 506 analyzes the list of items and creates an object to represent each item described in the list. In each object created, the hierarchy generation module 506 includes information in the object that describes the object. For example, for an object created to represent an item, the hierarchy generation module 506 may include information about the item from the list received, such as an item number, the price of the item, the quantity, and a short description of the item.

Additionally, the hierarchy generation module 506 may include one or more tags in any of the objects created. A tag is supplemental information included in an object, which is used by modules in the payment system 106 to determine how the object should be processed to enable the purchase transaction of the items described in the list and/or to determine how the object should be rendered on a buy page presented to the buyer 102. In one embodiment, the hierarchy generation module 506 determines whether to include one or more tags in an object by analyzing information included in the object and/or by analyzing information included in the list received from the merchant 104. For example, if the hierarchy generation module 506 analyzes information included in the list for an item and identifies information indicating that the item is state tax exempt, the hierarchy generation module 506 will include a state-tax-exempt tag in an object created to represent the item. In one embodiment, the hierarchy generation module 506 includes a buyer-item tag in each item object created. A buyer-item tag indicates that its respective object represents an item that a buyer 102 wishes to purchase. In one embodiment, the hierarchy generation module 506 includes in the electronic shopping cart object a cart tag to indicate that the object represents an electronic shopping cart Each object created can be made dependent on another object, which allows the hierarchy generation module 506 to create the structure of the hierarchy. In one embodiment, the hierarchy generation module 506 establishes the electronic shopping cart object as the root of the hierarchy and makes each item object a dependent of the electronic shopping cart object. In one embodiment, the hierarchy generation module 506 assigns an identification number to the hierarchy.

A strategy selection module 508 selects strategies for processing a hierarchy to generate purchase information for a purchase transaction and for displaying the generated purchase information to a buyer 102. The strategy selection module 508 analyzes the hierarchy created by the hierarchy generation module 506 and selects a processing strategy for the hierarchy. The execution of a processing strategy on the hierarchy results in the creation of purchase information used during the purchase of items represented in the hierarchy. In one embodiment, a processing strategy is comprised of multiple updaters. Each updater when executed analyzes tags and information of objects in the hierarchy and performs a specific function on the hierarchy.

The strategy selection module 508 includes multiple processing strategies and selects a processing strategy to execute using information about the buyer 102 and/or the merchant 104 associated with the hierarchy. In one embodiment, the strategy selection module 508 uses the billing address of the buyer 102 and/or the location of the merchant 104 to select a processing strategy for the hierarchy. In one embodiment, the strategy selection module 508 selects a first processing strategy if the buyer 102 is logged into the payment system 106 and a second processing strategy if the buyer 102 is not logged into the payment system 106. If a buyer 102 is logged into the payment system 106, additional information is known about the buyer 102 (e.g., shipping address), which allows additional information to be generated (e.g., shipping cost) for the purchase transaction.

The strategy selection module 508 also selects a display preprocessing strategy for the hierarchy. The execution of a display preprocessing strategy allows information included in the hierarchy to be displayed to the buyer 102 in a buy page. In one embodiment, a display preprocessing strategy is comprised of multiple populators. Each populator when executed searches for one or more tags in the hierarchy and creates a secondary data structure based on the one or more tags. The secondary data structures together form a data-package that includes the information from the hierarchy. In one embodiment, the data-package is a hash map. A hash map is a data structure that associates keys with information. When a key is provided, the hash map transforms the key using a hash function and uses the transformed key to locate information in the data structure associated with the key.

In one embodiment, the strategy selection module 508 selects a display preprocessing strategy based on the processing strategy selected for the hierarchy. In another embodiment, a display preprocessing strategy is selected using information about the buyer 102 and/or the merchant 104 associated with the hierarchy. In one embodiment, the strategy selection module 508 selects a first display preprocessing strategy if the buyer 102 is logged into the payment system 106 and a second display preprocessing strategy if the buyer 102 is not logged in.

The strategy selection module 508 sends a request for an updater execution module 510 to execute the processing strategy selected and sends a request for a populator execution module 512 to execute the display preprocessing strategy selected. The updater execution module 510 executes the processing strategy selected by the strategy selection module 508. In one embodiment, the updater execution module 510 retrieves from an updater storage 518 updaters associated with the selected processing strategy. The updater storage 518 stores multiple updaters, each updater part of at least one processing strategy. The updater execution module 510 executes each retrieved updater in an order defined by the selected processing strategy. The execution of the updaters results in the generation of purchase information necessary for the purchase transaction, such as information describing the taxes applicable to each item and total taxes for the purchase transaction. Purchase information generated by the executed updaters is represented in the hierarchy by one or more objects and/or tags.

In one embodiment, if an updater is associated with the processing strategy selected by the strategy selection module 508 when a buyer 102 is logged into the payment system 106, the updater may use stored information about the buyer 102 to generate information for the hierarchy. For example, if the updater is generating information about the cost of shipping for items represented in the hierarchy, the updater will use the shipping address of the buyer 102, which is stored in the buyer storage 522, to calculate the cost of shipping for the items. This shipping updater would not have been executed if the strategy selection module 508 had selected the strategy associated with buyers 102 that are not logged in, since the buyer's shipping address would not have been known.

In one embodiment, an executing updater may perform one or more of the following actions: add one or more tags to objects in the hierarchy, generate purchase information, calculate a sum value, and create a new object to replace an object in the hierarchy. In one embodiment, an updater executing to add a tag to specific objects in the hierarchy identifies each object in the hierarchy having a specific characteristic. For each object identified, the updater places a tag in the object, which is used for processing the object and/or for rendering the object on a buy page. For example, a state tax annotator updater identifies each item object in the hierarchy and determines for each identified item object whether state tax is applicable to the item object. If state tax is applicable to the item object, the state tax annotator will include a tag in the item object that indicates that the item object is state taxable.

In one embodiment, an updater executing to generate purchase information identifies one or more objects in the hierarchy having specific characteristics, generates the purchase information based on the one or more identified objects and creates one or more new objects in the hierarchy to include the generated purchase transaction information. For example, a state tax inserter updater will identify each item object in the hierarchy that includes a tag indicating that the item object is state taxable. For each state taxable item object, the state tax inserter updater calculates a state tax value for the item object. The state tax inserter updater creates a new object that includes the state tax value calculated for the item and includes a tag that indicates that the object represents the state taxes of the item object. In one embodiment, the new object is placed below the item object in the hierarchy to indicate that the state tax value of the new object is associated with the item object.

In one embodiment, an updater executing to calculate a sum value identifies one or more objects in the hierarchy having specific characteristics, sums the value of the identified objects and creates a new object in the hierarchy that includes the total value. For example, a tax totaller updater identifies every object in the hierarchy that represents a tax and sums the total value of the identified objects. The tax totaller updater creates a new object that includes the total tax value and includes a tag that indicates that the object represents the total tax for the purchase transaction.

In one embodiment, an updater executing to create a new object to replace an object identifies an object having a specific characteristic, generates information based on one or more objects in the hierarchy, and creates a new object that includes the generated information and replaces the identified object. For example, a tax inclusive superseder updater identifies an item object in the hierarchy whose current value includes only the value of the item. When the tax inclusive superseder updater identifies an item object that meets the criteria, the tax inclusive superseder updater identifies an object that represents the taxes for the item object. The tax inclusive superseder updater sums the value of the item object and the value of the item tax object to generate a value that includes the value of the item with taxes. The tax inclusive superseder updater creates a new object in the hierarchy that includes the generated value. The new object is placed below the item object. Additionally, the tax inclusive superseder updater includes a tag in the item object to indicate that the item object has been superseded and includes a tag in the new object to indicate that the new object has superseded the identified item object.

In one embodiment, the populator execution module 512 executes after the updater execution module 510. The populator execution module 512 executes the display preprocessing strategy selected by the strategy selection module 508 by retrieving from a populator storage 520 populators associated with the selected display preprocessing strategy. In one embodiment, the populator storage 520 is comprised of multiple populators, each populator part of at least one display preprocessing strategy. The populator execution module 512 executes each populator retrieved in an order defined by the display preprocessing strategy. Each populator when executed searches objects in the hierarchy for one or more tags and creates a secondary data structure based on the one or more tags found. The populator execution module 512 uses the multiple secondary data structures created by the populators to create a data-package. In one embodiment, the data-package is a hash map.

The populator execution module 512 operates in tandem with the payment system communication module 502 to transmit the data-package to the buyer 102. The buyer's browser 310 converts the data-package into a buy page. On the buy page, the buyer can make selections to modify the purchase transaction (e.g., select a shipping method, apply coupon to the purchase transaction) or can select to complete the purchase transaction. In one embodiment, after transmitting the data-package to buyer 102, the populator execution module 512 stores the hierarchy in the buyer storage 522. In another embodiment, after transmitting the data-package to buyer 102, the populator execution module 512 stores data in the buyer storage 522 that will allow the payment system 106 to recreate the hierarchy if needed.

A buyer interaction module 514 updates the hierarchy based on selections made by the buyers 102 on the buy page. When a buyer 102 viewing a buy page makes one or more selections on the buy page, such as selecting to get an item gift wrapped, the buyer's browser 310 creates a data-package that represents the buy page and includes the one or more selections made by the buyer 102. The buyer interaction module 514 receives the data-package from the buyer's browser and decodes it to determine what selections were made by the buyer 102. If the buyer 102 selected to complete the purchase transaction, the buyer interaction module 514 sends a request to a purchase transaction module 516 to invoice the buyer 102. Alternatively, if the buyer 102 made one or more selections to modify the purchase transaction, the buyer interaction module 514 stores the one or more selections made by the buyer 102 in a buyer selection data structure associated with the hierarchy used to create the buy page. The buyer selection data structure may include data on previous selections made by the buyer 102.

In one embodiment, the buyer interaction module 514 uses the hierarchy identification number included in the data-package to determine the corresponding hierarchy used for creating the buy page. In one embodiment, the buyer interaction module 514 uses the hierarchy identification number to retrieve the hierarchy corresponding to the buy page from the buyer storage 522. In another embodiment, the buyer interaction module 514 instructs the hierarchy generation module 506 to recreate the hierarchy corresponding to the buy page using data stored in the buyer storage 522 and/or by using data from the received data-package. The buyer interaction module 514 transmits to the strategy selection module 508 a request for the strategy selection module 508 to select a processing strategy and a display preprocessing strategy for the hierarchy based on the one or more selections made by the buyer 102 to modify the purchase transaction. For example, if the buyer selected a shipping method (e.g., standard shipping) for the items on the buy page, the strategy selection module 508 will select a processing strategy that will update objects related to shipping in the hierarchy and will update one or more objects in the hierarchy related to the total price for the purchase transaction.

The buyer interaction module 514 instructs the updater execution module 510 to execute the selected processing strategy on the hierarchy. During the execution of the selected processing strategy, the updater execution module 510 uses the data stored in a buyer selection data structure associated with the hierarchy in order to update the hierarchy based on the one or more selections made by the buyer 102. After the execution of the selected processing strategy, the buyer interaction module 514 instructs the populator execution module 512 to execute the selected display preprocessing strategy. The execution of the display preprocessing strategy results in the creation of a new data-package that includes information from the updated hierarchy. The buyer interaction module 514 transmits the new data-package to the buyer 102. The buyer's browser 310 uses the data-package to create a new buy page that reflects the one or more selections made by the buyer 102.

The purchase transaction module 516 invoices buyers 102 and credits merchants 104 for completed purchase transactions. In one embodiment, when a buyer 102 selects to complete the purchase transaction, the purchase transaction module 516 charges the buyer's credit card or other method of payment and provides the buyer 102 with a receipt to verify that the purchase transaction has been completed. In one embodiment, the purchase transaction module 516 credits the merchant associated with the purchase transaction for the amount of the purchase and sends a message to the merchant 104 to notify the merchant 104 that the purchase transaction has been completed. In one embodiment, the message includes a transaction ID that identifies the completed purchase transaction, a list of items purchased by the buyer 102, and shipping information for the items. In one embodiment, the shipping information includes shipping address, shipping method, and shipping options for the items.

III. Process/Examples

Figure 6A:
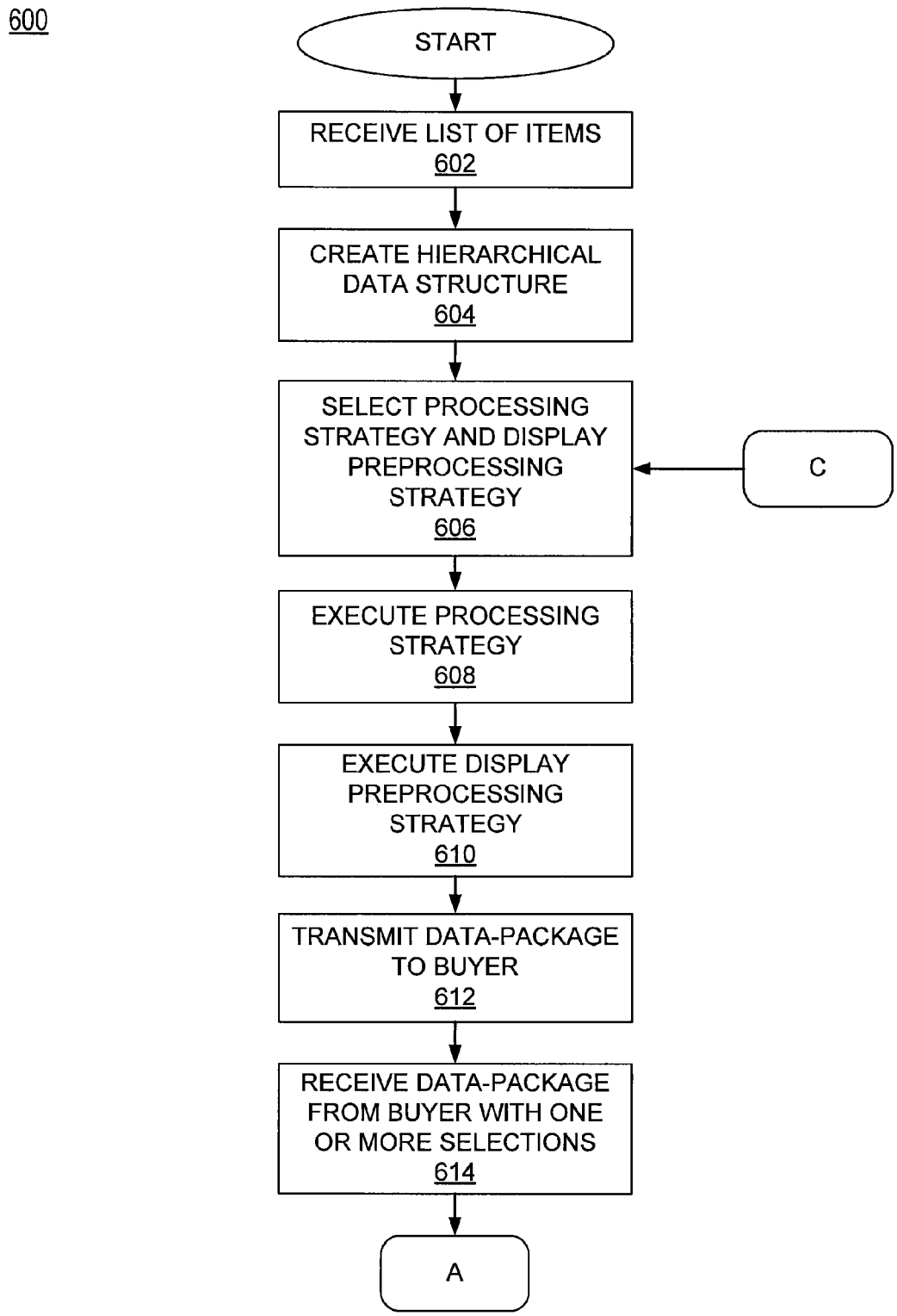
FIGS. 6A and 6B are a flow chart illustrating the operations of the payment system according to one embodiment.
Figure 6B:
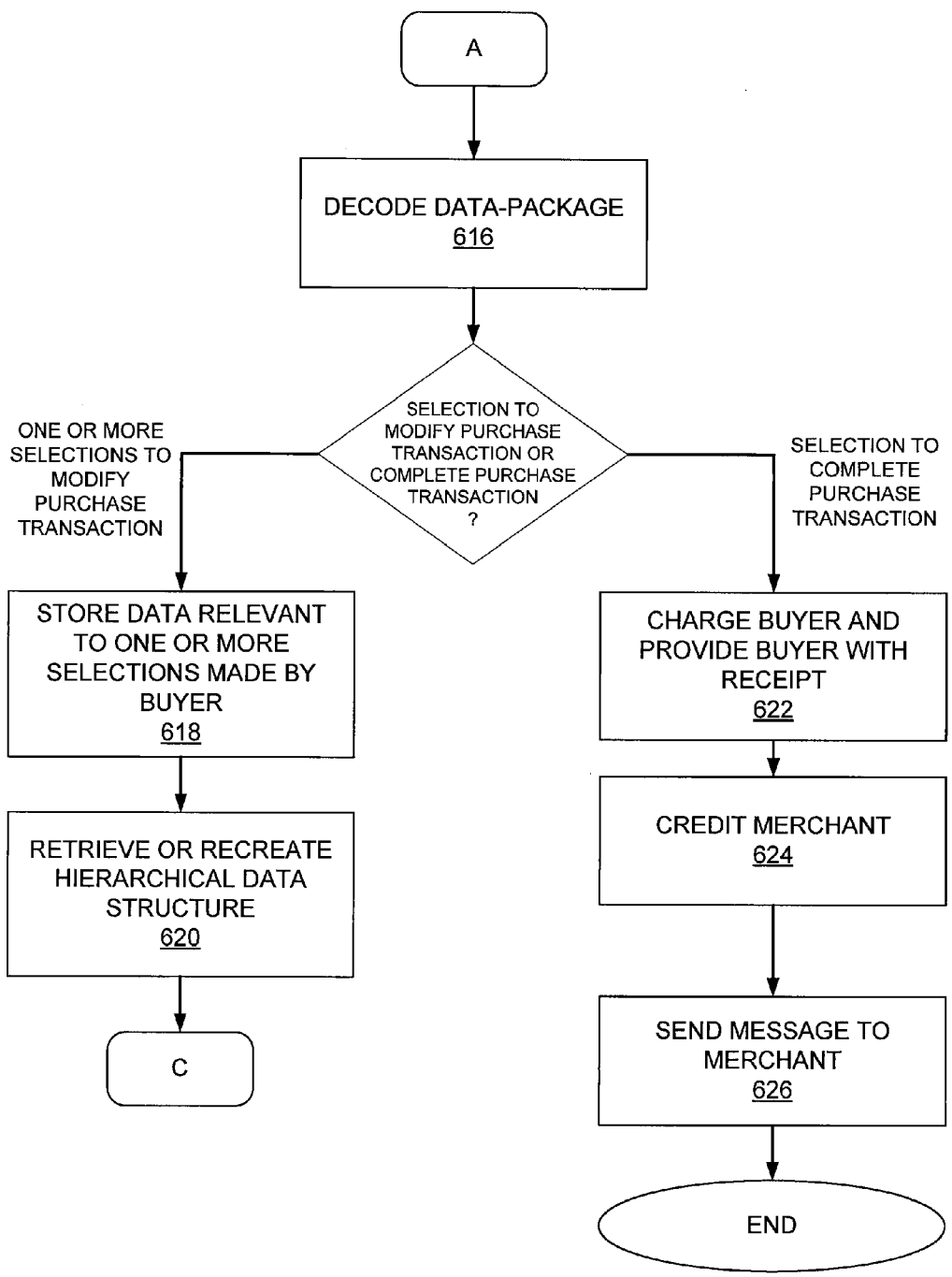

FIGS. 6A and 6B are a flow chart 600 illustrating the operations of the payment system 106 according to one embodiment. Those of skill in the art will recognize that other embodiments can perform the steps of FIGS. 6A and 6B in different orders. Moreover, other embodiments can include different and/or additional steps than the ones described here.

FIGS. 6A and 6B illustrate steps performed by the payment system 106 during a purchase transaction where a buyer 102 is using the payment system 106 to purchase one or more items from a merchant 104. Assume for purposes of this example that the buyer 102 uses a web browser to browse the merchant's web site, and selects one or more items to purchase. The merchant 104 places the items in an electronic shopping cart, and offers the buyer 102 the option to purchase the items using the payment system 106. The buyer 102 selects this option and is directed by the merchant 104 to a payment system web site.

The payment system 106 receives 602 a list of items that the buyer 102 wishes to purchase from the merchant 104. For each item, the list includes information about the item, such as the price of the item, a brief description of the item, and shipping and tax rules applicable to the item. The payment system 106 creates 604 a hierarchical data structure based on the list of items. In one embodiment, the payment system 106 creates a first object that represents an electronic shopping cart and creates an additional object for each item in the list. The payment system 106 includes, in each object created, information that describes the object (e.g., the price of the item represented by the object). Additionally, the payment system 106 may include in any of the objects in the hierarchy one or more tags, which are supplemental information used by the payment system 106 to process the objects and/or to render the objects on a buy page. The payment system 106 makes each item object dependent on the electronic shopping cart object.

The payment system 106 selects 606 a processing strategy and a display preprocessing strategy for the hierarchy based on information about the buyer 102 and/or the merchant 104. In one embodiment, the payment system 106 selects the processing strategy and the display processing strategy for the hierarchy based on whether the buyer 102 is logged into the payment system 106. The payment system 106 executes 608 the processing strategy, which results in the generation of purchase information used in the purchase transaction. The generated purchase information is represented in the hierarchy by one or more additional objects and/or tags. In one embodiment, the processing strategy is comprised of multiple updaters. Each updater is executed as part of the execution of the processing strategy.

The payment system 106 executes 610 the display preprocessing strategy, which results in a data-package being created that includes information from the hierarchy. In one embodiment, the preprocessing strategy is comprised of multiple populators and each populator when executed creates a secondary data structure based on one or more tags in the hierarchy. The secondary data structures created by the populators together form the data-package. The payment system 106 transmits 612 the data-package to the buyer 102. The buyer's browser converts the data-package into a buy page that shows information for the purchase transaction, such as which items are being purchased and the price for the purchase transaction. On the buy page the buyer 102 can select to modify the purchase transaction (e.g., select a shipping method) or can select to complete the purchase transaction. When the buyer 102 makes one or more selections on the buy page, the payment system 106 receives 614 a data-package that includes the one or more selections made by the buyer 102.

The payment system 106 decodes 616 the data-package to determine what selections were made by the buyer 102 on the buy page. If the buyer made one or more selection to modify the purchase transaction, the payment system stores 618 data relevant to the one or more selections made by the buyer 102 in a buyer selection data structure associated with a hierarchy that was used to create the buy page. The payment system 106 retrieves 620 or recreates the hierarchy used to create the buy page. The payment system 106 selects a processing strategy and a display preprocessing strategy for the hierarchy based on the selections made by the buyer 102. The processing strategy and the display preprocessing strategy are both executed by the payment system 106 using the data in the buyer selection data structure. A new data-package is created based on the execution of the display preprocessing strategy and transmitted to the buyer 102. A new buy page is created by the buyer's browser based on the new data-package. The new buy page reflects the one or more selections made by the buyer 102.

Alternatively, if the buyer 102 selected to complete the purchase transaction, the payment system 106 charges 622 the buyer's method of payment (e.g., credit card) and provides the buyer 102 with a receipt to confirm that the purchase transaction has been completed. The payment system 106 credits 624 the merchant 104 associated with the purchase transaction for the amount of the purchase. The payment system 106 sends 626 a message to the merchant 104 to notify the merchant 104 that the purchase transaction has been completed and to provide the merchant 104 with information for the delivery of the items purchased by the buyer 102.

FIGS. 7A through 7F illustrate an example of executing a processing strategy according to one embodiment. Assume for purposes of this example that a merchant 104 transmits to the payment system 106 a list of items that includes a barometer and a food item. The list of items indicates that the price of the barometer is $14.00 and the price of the food item is $4.50. Additionally, the list of items indicates that the food item is state tax exempt. In this example a processing strategy is executed that includes the following updaters: state tax annotator, state tax inserter, state tax detail totaller, tax totaller, and cart totaller.

Figure 7A:
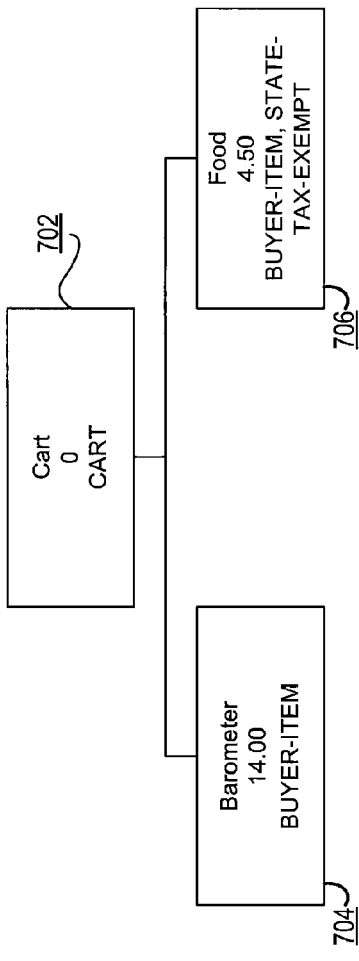
FIGS. 7A through 7F illustrate an example of executing a processing strategy according to one embodiment.

FIG. 7A illustrates a hierarchy created by the payment system 106 based on the list of items received from the merchant 104. The hierarchy includes objects 702, 704, and 706. Object 702 is the root of the hierarchy and represents an electronic shopping cart. Object 704 represents the barometer item and includes information indicating the price of the barometer. Additionally, the payment system 106 includes a buyer-item tag in the barometer object 704 to indicate that the object represents an item selected by a buyer 104 for purchase.

Object 706 represents the food item and includes information indicating the price of the item. Like the barometer object 704, the food item object 706 includes a buyer-item tag. Additionally, since information in the list of items indicates that the food item is state tax exempt, the payment system 106 includes a state-tax-exempt tag in the food item object 706. Both the barometer object 704 and the food item object are made dependent on object 702 to indicate that the objects are within the electronic shopping cart.

Figure 7B:
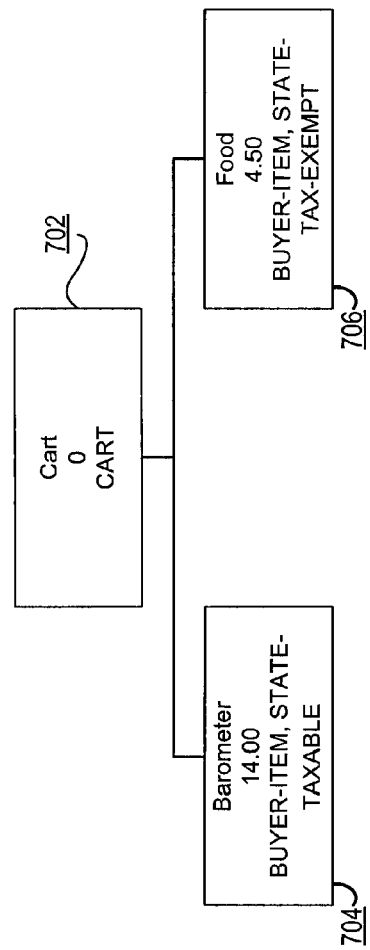

FIG. 7B illustrates the execution of the state tax annotator updater by the payment system 106. The state tax annotator updater includes a state-taxable tag in each object that includes a buyer-item tag, but does not include a state-tax-exempt tag. In FIG. 7B, the barometer object 704 is the only object that meets the criteria, which is why the barometer object 704 receives a state-taxable tag. The state-taxable tag indicates that state tax is to be applied to the barometer object.

Figure 7C:
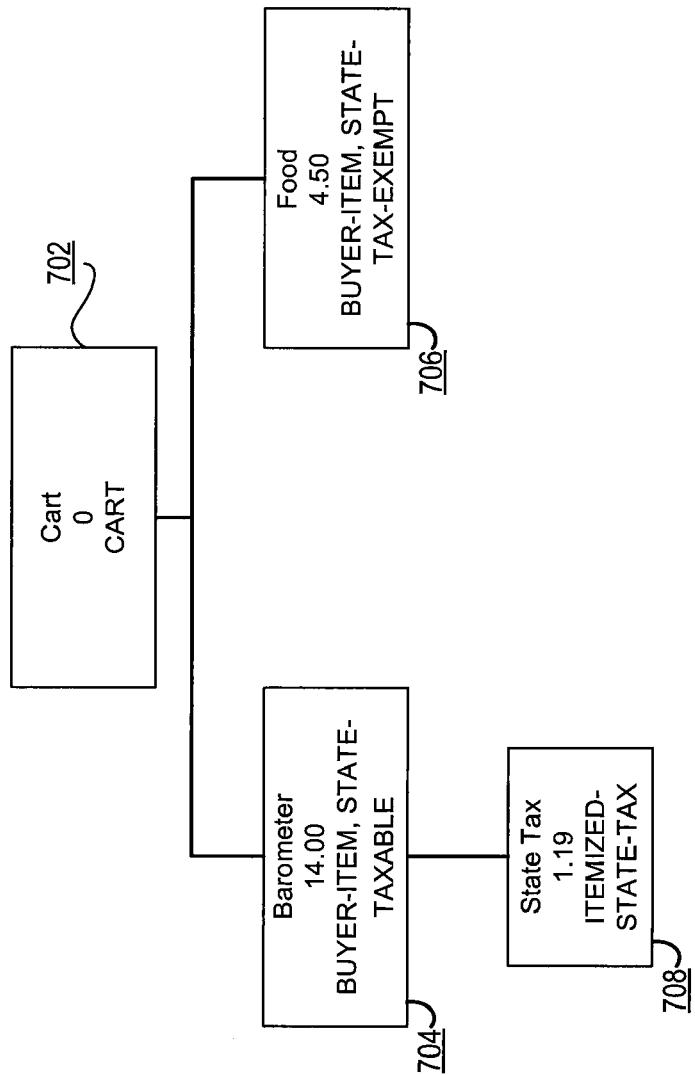

FIG. 7C illustrates the execution of the state tax inserter updater by the payment system 106. The state tax inserter updater calculates a tax amount for each object that includes a buyer-item tag and a state-taxable tag. In FIG. 7C, the state tax inserter updater calculates a tax amount for only the barometer object, which the state tax inserter updater calculates to be $1.19. The tax inserter updater creates a new object 708 in the hierarchy to include the calculated state tax amount. Additionally, the tax inserter updater includes an itemized-state-tax tag in object 708 and makes object 708 dependent on the barometer object 704 to indicate that the calculated state tax amount of object 708 is associated with the barometer object 704. It should be noted that in this example state taxes are calculated for the purchase transaction, however the same technique can be applied to any entity or zone that collects taxes.

Figure 7D:
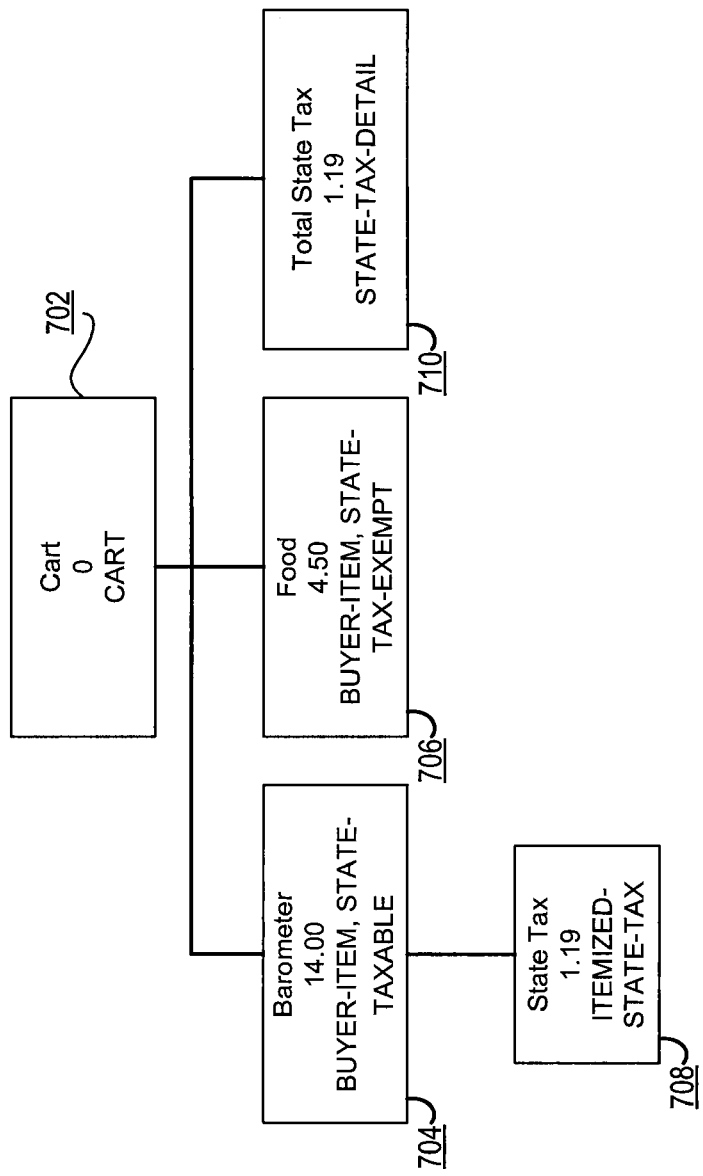

FIG. 7D illustrates the execution of the state tax detail totaller updater by the payment system 106. The state tax detail totaller updater sums the total value of all objects in the hierarchy with an itemized-state-tax tag. In FIG. 7D, the total value summed is $1.19, since object 708 is the only object in the hierarchy with an itemized-state-tax tag. The total value summed by the state tax detail totaller updater is included in a new object 710 created by the state tax detail totaller updater. The new object 710 represents the total state taxes for all items in the hierarchy. The tax detail totaller updater additionally includes a state-tax-detail tag with the new object 710 and makes the new object 710 dependent on the cart object 702.

Figure 7E:
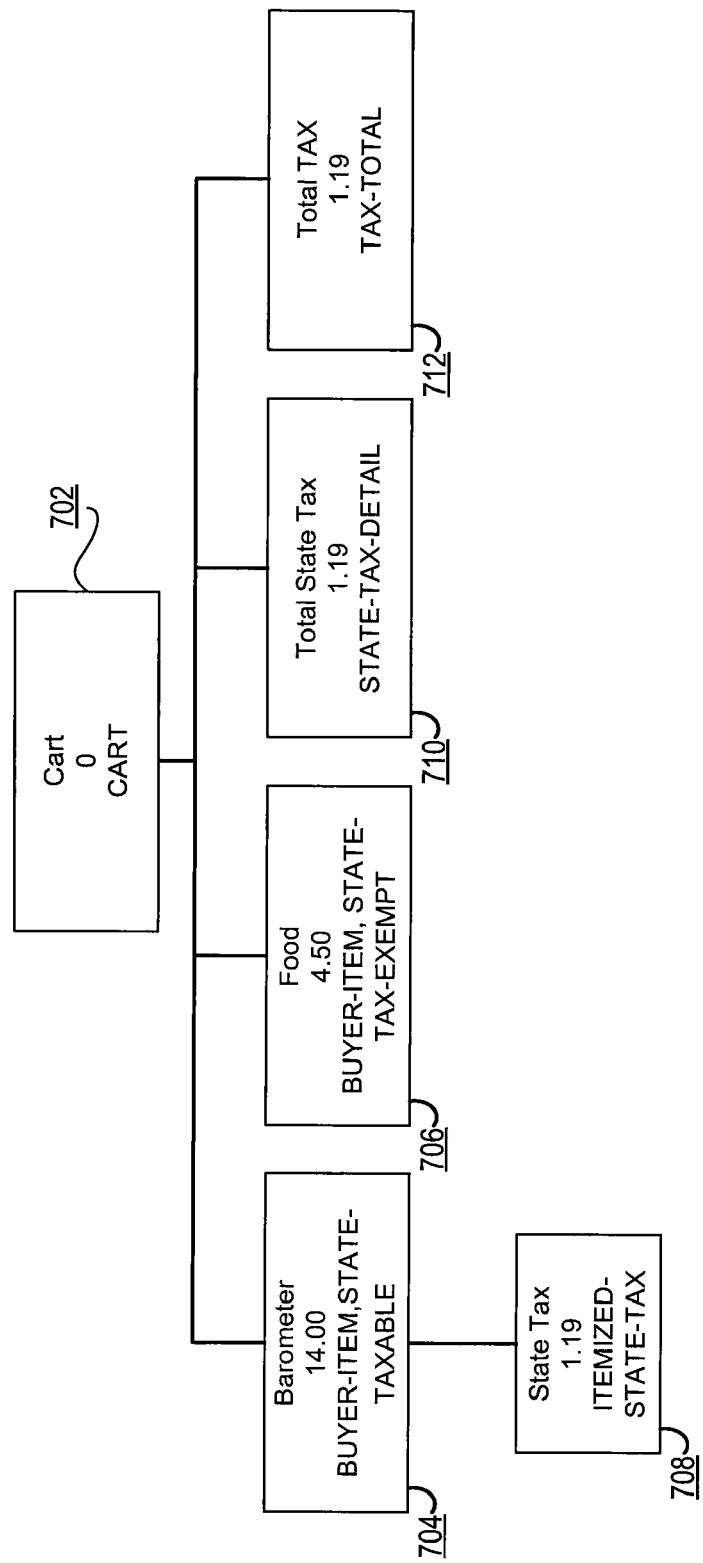

FIG. 7E illustrates the execution of the tax totaller updater by the payment system 106. The tax totaller updater sums the total value of all objects in the hierarchy with a tax-detail type of tag. In FIG. 7E the total value summed is $1.19, since object 710 includes a state-tax-detail tag. The total value summed by the tax totaller updater is included in a new object 712 created by the tax totaller. The new object 712 represents the total taxes for the purchase transaction. The tax totaller updater includes a tax-total tag with the new object 712 and makes the new object 712 dependent on the cart object 702.

Figure 7F:
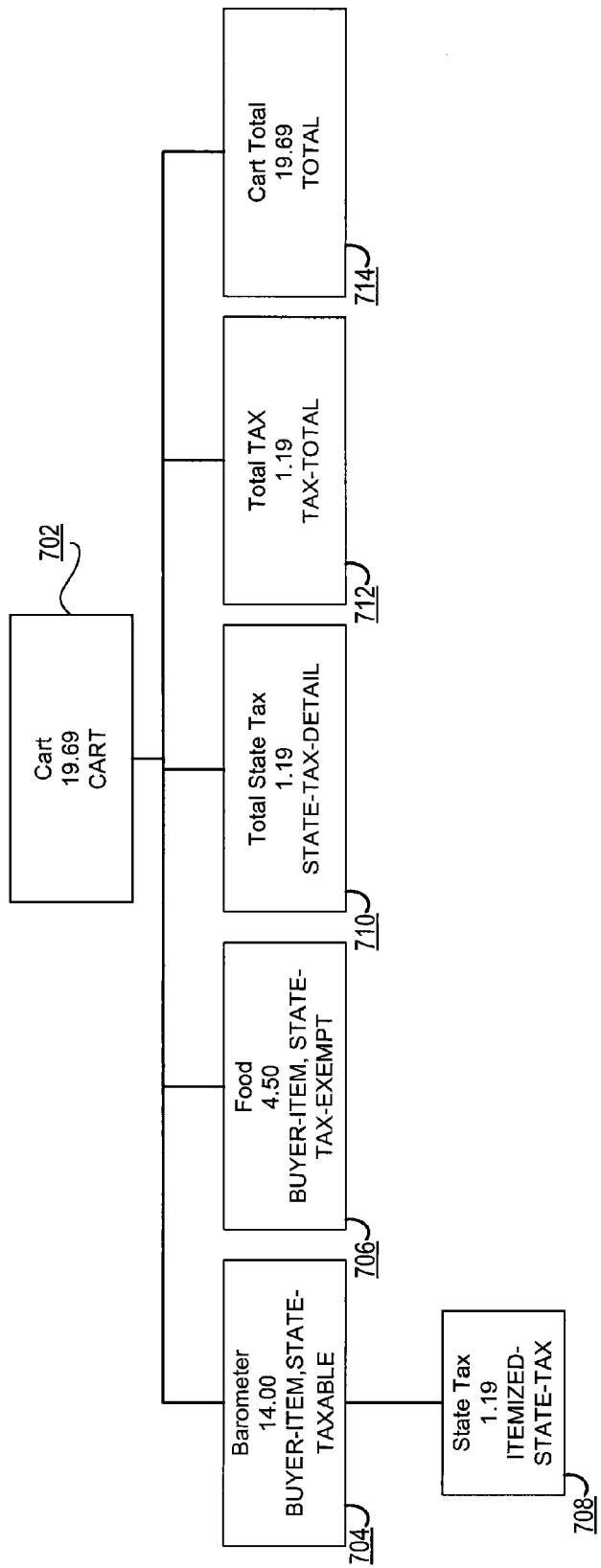

FIG. 7F illustrates the execution of the cart totaller updater by the payment system 106. The cart totaller updater sums the total value of all objects in the hierarchy with a buyer-item tag and tax-total tag. In FIG. 7F the cart totaller updater sums the total value of objects 704, 706, and 712, which is $19.69. A new object 714 is created by the car totaller updater that includes the summed total value and is made dependent to the cart object 702. The cart totaller updater includes in object 714 a total tag to indicate that object 714 represents the total value of the purchase transaction.

After the execution of the cart totaller the hierarchy represents a shopping cart that includes all necessary information for the purchase transaction. The payment system creates a data-package based on the hierarchy and transmits it to the buyer's browser which generates a buy page based on the data-package. In this example, the buy page displayed to the buyer would display the barometer item with a price of $14.00, state taxes for the barometer of $1.19, a food item with a price of $4.50, total state taxes for the purchase transaction of $1.19, total taxes for the purchase transaction of $1.19, and a total for the purchase transaction of $19.69.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for processing one or more items identified by a buyer for purchase from a merchant, comprising:

receiving, by one or more computing devices, a description of one or more items identified by a buyer for purchase in an electronic commerce transaction, the description of the one or more items comprising tax rules applicable to each item, each item comprising a different tax rule;

responsive to receiving the description, generating, by the one or more computing devices, a hierarchical data structure, based on the description of the one or more items, stored in memory and including a shopping cart object that represents an electronic shopping cart holding the one or more items and including, for each item, an item object that represents the item and stores information associated with the item, the shopping cart object at a root of the hierarchical data structure and the item object beneath the shopping cart object in the hierarchical data structure;

identifying, by the one or more computing devices, one or more objects in the hierarchical data structure having a specific characteristic;

including, by the one or more computing devices, in each identified object, a tag associated with the characteristic for processing the object to generate purchasing information;

executing, by the one or more computing devices, a processing strategy on the hierarchical data structure to generate purchasing information describing the transaction involving the items, the generated purchasing information stored in the hierarchical data structure, wherein the purchasing information comprises tax information applicable to the transaction based on the tax rules applicable to each item from the received description of the one or more items;

executing, by the one or more computing devices, a display preprocessing strategy on the hierarchical data structure to create display information describing a display of the generated purchasing information, wherein the display information comprises the tax information applicable to the transaction; and transmitting, by the one or more computing devices, the display information to the buyer for generation of the display.

2. The method of claim 1, further comprising selecting, by the one or more computing devices, the processing strategy and display preprocessing strategy to execute based at least in part on characteristics of the buyer.

3. The method of claim 1, wherein executing the display preprocessing strategy comprises:

searching for the tag in one or more objects of the hierarchical data structure; and creating the display information based at least in part on the tag found.

4. The method of claim 1, wherein executing a processing strategy comprises:

identifying one or more objects in the hierarchical data structure having a specific same characteristic;

generating purchasing information based on the one or more identified objects; and creating an object in the hierarchical data structure including the purchase-purchasing information.

5. The method of claim 1, wherein executing a processing strategy comprises:

identifying one or more objects in the hierarchical data structure having a specific same characteristic, each identified object having an associated value;

summing the values of the identified objects; and creating an object in the hierarchical data structure including the summed value.

6. The method of claim 1, wherein executing a processing strategy comprises:

identifying an object having a specific characteristic;

generating purchasing information based on the identified object and one or more other objects in the hierarchical data structure; and creating an object in the hierarchical data structure including the generated purchasing information and superseding the identified object in the hierarchical data structure.

7. The method of claim 1, wherein the display information comprises a hash map.

8. The method of claim 1, further comprising:

receiving, by the one or more computing devices, information from the buyer indicating one or more selections made by the buyer in response to the display generated using the display information; and updating, by the one or more computing devices, the hierarchical data structure based on the one or more selections made by the buyer.

9. The method of claim 1, further comprising:

responsive to the buyer requesting to complete the purchase of the one or more items, charging, by the one or more computing devices, the buyer for the purchase;

sending, by the one or more computing devices, a message to the merchant to notify the merchant of the purchase; and providing, by the one or more computing devices, the merchant with information for the delivery of the one or more items.

10. The method of claim 1, further comprising selecting the processing strategy and the display preprocessing strategy to execute based at least in part on an address of the buyer.

11. The method of claim 1, further comprising selecting the processing strategy and the display preprocessing strategy to execute based on whether the buyer is logged in, wherein the buyer is logged in response to the buyer providing valid authentication information.

12. The method of claim 1, wherein executing a processing strategy comprises:

calculating a tax value based on one or more objects in the hierarchical data structure; and creating an object in the hierarchical data structure including the calculated tax value.

13. The method of claim 1, wherein executing a processing strategy comprises:

calculating a total value for the purchase transaction based on one or more objects in the hierarchical data structure; and creating an object in the hierarchical data structure including the calculated total value.

14. The method of claim 1, wherein the purchasing information is organized so that tax information is associated with each corresponding item in the transaction and wherein the display information further comprises the tax information applicable to the transaction organized so that the tax information for each item is displayed as associated with the corresponding item.

15. A computer program product, comprising: a non-transitory computer-readable medium having computer-executable program code embodied thereon that when executed by a computer cause the computer to process one or more items identified by a buyer for purchase from a merchant, the computer-readable program code comprising:

computer-executable program code to receive a description of one or more items identified by a buyer for purchase in an electronic commerce transaction, the description of the one or more items comprising tax rules applicable to each item, each item comprising a different tax rule;

computer-executable program code to generate, responsive to receiving the description of the one or more items and based on the description of the one or more items, a hierarchical data structure for the transaction, the hierarchical data structure stored in memory and including a shopping cart object that represents an electronic shopping cart holding the one or more items and including, for each item, an item object that represents the item and stores information associated with the item, the shopping cart object at a root of the hierarchical data structure and the item object beneath the shopping cart object in the hierarchical data structure;

computer-executable program code to identify one or more objects in the hierarchical data structure having a specific characteristic;

computer-executable program code to include, in each identified object, a tag associated with the characteristic for processing the object to generate purchasing information;

computer-executable program code to execute a processing strategy on the hierarchical data structure to generate purchasing information describing the transaction involving the items, the generated purchasing information stored in the hierarchical data structure, wherein the purchasing information comprises tax information applicable to the transaction based on the tax rules applicable to each item from the received description of the one or more items;

computer-executable program code to execute a display preprocessing strategy on the hierarchical data structure to create display information describing a display of the generated purchase information, wherein the display information comprises the tax information applicable to the transaction; and computer-executable program code to transmit the display information to the buyer for generation of the display.

16. The computer program product of claim 15, further comprising computer-executable program code to select the processing strategy and the display preprocessing strategy to execute based at least in part on characteristics of the buyer.

17. The computer program product of claim 15, further comprising:
  computer-executable code to search for the tag in one or more objects of the hierarchical data structure; and
  computer-executable code to create the display information based at least in part on the tag found.

18. The computer program product of claim 15, further comprising:
  computer-executable program code to identify one or more objects in the hierarchical data structure having a specific same characteristic;
  computer-executable program code to generate purchasing information based on the one or more identified objects; and
  computer-executable program code to create an object in the hierarchical data structure including the purchasing information.

19. The computer program product of claim 15, further comprising:

computer-executable program code to identify one or more objects in the hierarchical data structure having a specific same characteristic, each identified object having an associated value;
  computer-executable program code to sum the values of identified objects; and
  computer-executable program code to create an object in the hierarchical data structure including the summed value.

20. The computer program product of claim 15, further comprising:
  computer-executable program code to identify an object having a specific characteristic;
  computer-executable program code to generate purchasing information based on the identified object and one or more objects in the hierarchical data structure; and
  computer-executable program code to create an object in the hierarchical data structure including the generated purchasing information and superseding the identified object in the hierarchical data structure.

21. The computer program product of claim 15, wherein the display information comprises a hash map.

22. The computer program product of claim 15, further comprising:
  computer-executable program code to receive information from the buyer indicating one or more selections made by the buyer in response to the display generated using the display information; and
  computer-executable program code to update the hierarchical data structure based on the one or more selections made by the buyer.

23. The computer program product of claim 15, further comprising:
  computer-executable program code to charge the buyer for the purchase, responsive to the buyer requesting to complete the purchase of the one or more items; and
  computer-executable program code to send a message to the merchant to notify the merchant of the purchase and provide the merchant with information for the delivery of the one or more items.

24. The computer program product of claim 15, wherein the purchasing information is organized so that tax information is associated with each corresponding item in the transaction and wherein the display information further comprises the tax information applicable to the transaction organized so that the tax information for each item is displayed as associated with the corresponding item.

25. A computer-implemented system for processing one or more items identified by a buyer for purchase from a merchant, the system comprising:
  a computer processor; and
  a computer-readable storage medium storing computer program modules configured to execute on the computer processor, the computer modules comprising:
    a communication module configured to receive a description of one or more items identified by a buyer for purchase, the description of the one or more items comprising tax rules applicable to each item, each item comprising a different tax rule;
    a hierarchy generation module configured to generate, responsive to receiving the description of the one or more items and based on the description of the one or more items, a hierarchical data structure for the transaction, the hierarchical data structure stored in memory and including a shopping cart object that represents an electronic shopping cart holding the one or more items and including, for each item, an item object that represents the item and stores information associated with the item, the shopping cart object at a root of the hierarchical data structure and the item object beneath the shopping cart object in the hierarchical data structure;

a processing module configured to:
identify one or more objects in the hierarchical data structure having a specific characteristic;
include, in each identified object, a tag associated with the characteristic for processing the object to generate purchasing information;
execute a processing strategy on the hierarchical data structure to generate purchasing information describing the transaction involving the items, the generated purchasing information stored in the hierarchical data structure, wherein the purchasing information comprises tax information applicable to the transaction based on the tax rules applicable to each item from the received description of the one or more items; and a display module configured to:
execute a display preprocessing strategy on the hierarchical data structure to create display information describing a display of the generated purchase information, wherein the display information comprises the tax information applicable to the transaction; and
transmit the display information to the buyer for generation of the display.

26. The system of claim 25, wherein the display module is further configured to:
search for the one or more tag in objects of the hierarchical data structure; and
create the display information based at least in part on the one or more tags found.

27. The system of claim 25, further comprising:
a selection module configured to receive information from the buyer indicating one or more selections made by the buyer in response to the display generated using the display information; and
the processing module further configured to update the hierarchical data structure based on the one or more selections made by the buyer.

28. The system of claim 25, wherein the purchasing information is organized so that tax information is associated with each corresponding item in the transaction and wherein the display information further comprises the tax information applicable to the transaction organized so that the tax information for each item is displayed as associated with the corresponding item.

* * * * *